(12) United States Patent
Del Signore et al.

(10) Patent No.: US 8,856,548 B2
(45) Date of Patent: Oct. 7, 2014

(54) PUBLIC CLOUD DATA AT REST SECURITY

(75) Inventors: Christopher Del Signore, San Jose, CA (US); Aseem Rastogi, Fremont, CA (US); Lintu Thomas, Fremont, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 95 days.

(21) Appl. No.: 13/585,725

(22) Filed: Aug. 14, 2012

(65) Prior Publication Data
US 2013/0219169 A1    Aug. 22, 2013

Related U.S. Application Data

(60) Provisional application No. 61/529,207, filed on Aug. 30, 2011.

(51) Int. Cl.
*H04L 29/06* (2006.01)
*H04L 9/32* (2006.01)

(52) U.S. Cl.
CPC .......... *H04L 63/0471* (2013.01); *H04L 9/3263* (2013.01); *H04L 9/32* (2013.01)
USPC ........... 713/189; 713/168; 713/193; 380/229; 380/232

(58) Field of Classification Search
CPC .................................................. H04L 63/0471
USPC ....................................................... 713/189
See application file for complete search history.

(56) References Cited

U.S. PATENT DOCUMENTS

| | | | |
|---|---|---|---|
| 6,711,679 B1 * | 3/2004 | Guski et al. | 713/156 |
| 6,823,453 B1 * | 11/2004 | Hagerman | 713/162 |
| 7,281,126 B2 * | 10/2007 | Smith et al. | 713/2 |
| 7,581,118 B2 * | 8/2009 | McGovern | 713/193 |
| 8,005,969 B2 * | 8/2011 | Miyazawa et al. | 709/229 |
| 8,190,921 B1 * | 5/2012 | Harwood et al. | 713/193 |
| 8,391,494 B1 * | 3/2013 | Serenyi | 380/278 |
| 8,595,460 B2 * | 11/2013 | Bhat et al. | 711/170 |
| 2003/0200247 A1 * | 10/2003 | Banzhaf et al. | 709/1 |
| 2007/0282747 A1 * | 12/2007 | Shen et al. | 705/51 |

* cited by examiner

*Primary Examiner* — Mohammad L Rahman
(74) *Attorney, Agent, or Firm* — Wong, Cabello, Lutsch, Rutherford & Brucculeri, L.L.P.

(57) ABSTRACT

An encryption switch which is used in a cloud environment to secure data on the LUNs used by the clients. A client provides a certificate to the cloud service. The encryption switch develops a cloud crypto domain (CCD) as a secure area, with the data at rest on the LUNs encrypted. The encryption switch develops a master key for client use in the CCD, which is provided to the client encrypted by the client's public key. Data encryption keys (DEKs) are created for each LUN and provided to the client. The DEKs are stored in a key vault by the client for use if needed. The cloud service provisions a client VM to be used with the encrypted LUN and develops a nexus between the LUN and the client VM for the encryption switch to use in data operations. The client communicates through the client VM to access the LUN.

8 Claims, 15 Drawing Sheets

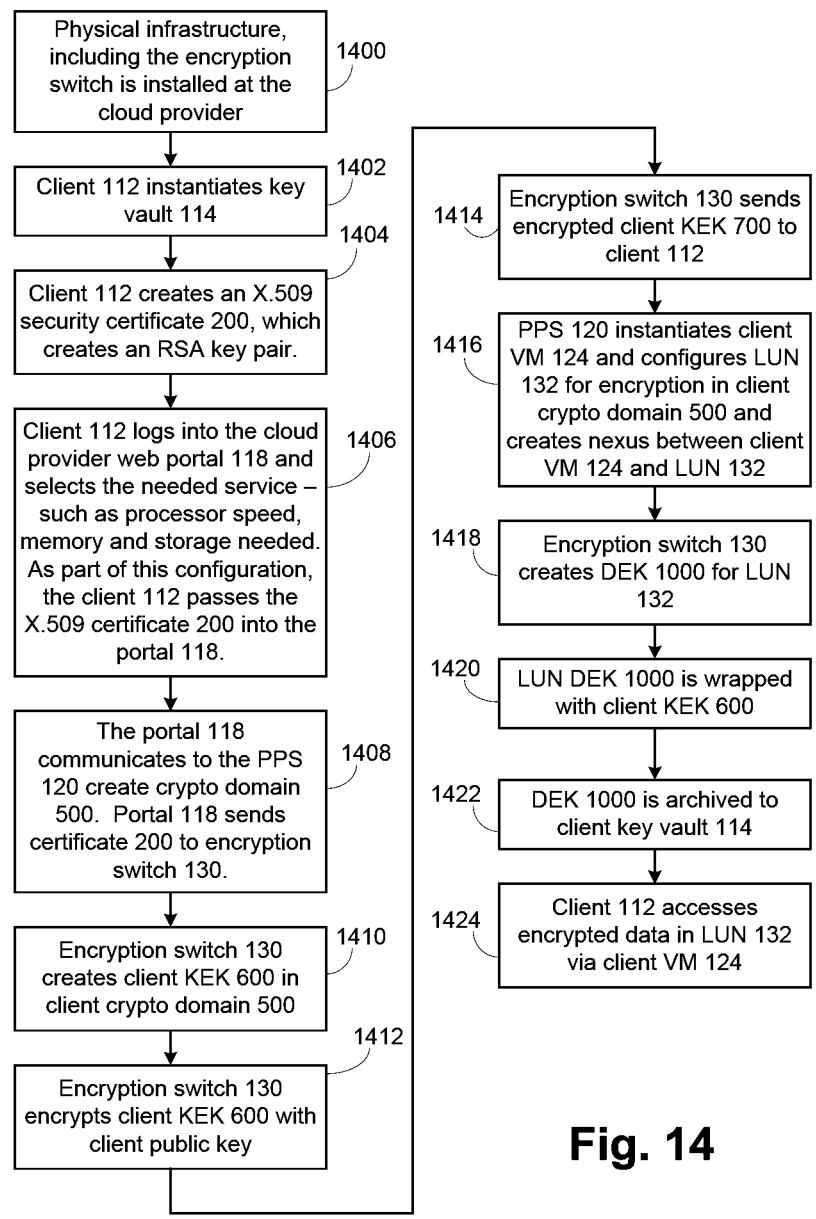

PUBLIC CLOUD DATA AT REST SECURITY

CROSS REFERENCE TO RELATED APPLICATIONS

This application claims the benefit under 35 U.S.C. §119 (e) of U.S. Provisional Patent Application Ser. No. 61/529, 207 entitled "Public Cloud Data at Rest Security and Storage Access Authentication Mechanism," filed Aug. 30, 2011, which is hereby incorporated by reference.

This application is also related to U.S. patent application Ser. No. 13/535,720, entitled "Storage Access Authentication Mechanism", filed concurrently herewith, which is incorporated by reference.

BACKGROUND OF THE INVENTION

1. Field of the Invention

The invention relates to secure access to data storage, and more particularly to data storage provided over a public network.

2. Description of the Related Art

As IT departments are increasingly placed under tighter budget constraints, cloud infrastructure—either private or public—is being employed to help keep costs down. One of the key inhibitors to adoption of cloud technology (in particular public cloud technology) is the concern of the exposure of customer data as it travels through, and is hosted in, the cloud provider's infrastructure. Although many different mechanisms exist for securing customer data in the cloud, there is one recurrent theme that customers express—they want to control those mechanisms. Put differently, IT practitioners are increasingly comfortable relying on the infrastructure providers to manage the software, servers, storage, and data center networks. However, when it comes to security, the client wants to maintain as much control as possible.

Most solutions rely on the client to encrypt their data using software-based encryption. These solutions incorporate software modules executing on the same servers that are executing the client's business logic (typically executing within the context of a virtual machine (VM). Software-based encryption is extremely CPU-intensive, so it can have a big impact on the utilization of a CPU. Additionally, the data encryption keys usually exist "in the clear" within the context of the customer's VM, presenting a greater risk that the data encryption keys can be compromised.

SUMMARY OF THE INVENTION

In embodiments according to the present invention, an encryption switch is used in a cloud environment to secure data on the logical unit numbers (LUNs) used by the clients. A client provides a certificate to the cloud service. The encryption switch develops a cloud crypto domain (CCD) as a secure area for that client, with the data at rest on the LUNs encrypted. The encryption switch develops a master key for client use in the CCD, which is provided to the client encrypted by the client's public key. Data encryption keys (DEKs) are created for each LUN in the CCD and provided to the client using the KEK for encryption. The DEKs are stored in a key vault by the client for use if needed. The cloud service provisions a client VM to be used with the encrypted LUN and develops a nexus between the LUN and the client VM for the encryption switch to use in data operations. The client then communicates through the client VM to access the LUN and store or retrieve data.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIG. 14 is a flowchart of operations according to the present invention.

DETAILED DESCRIPTION OF THE PREFERRED EMBODIMENTS

Figure 1:
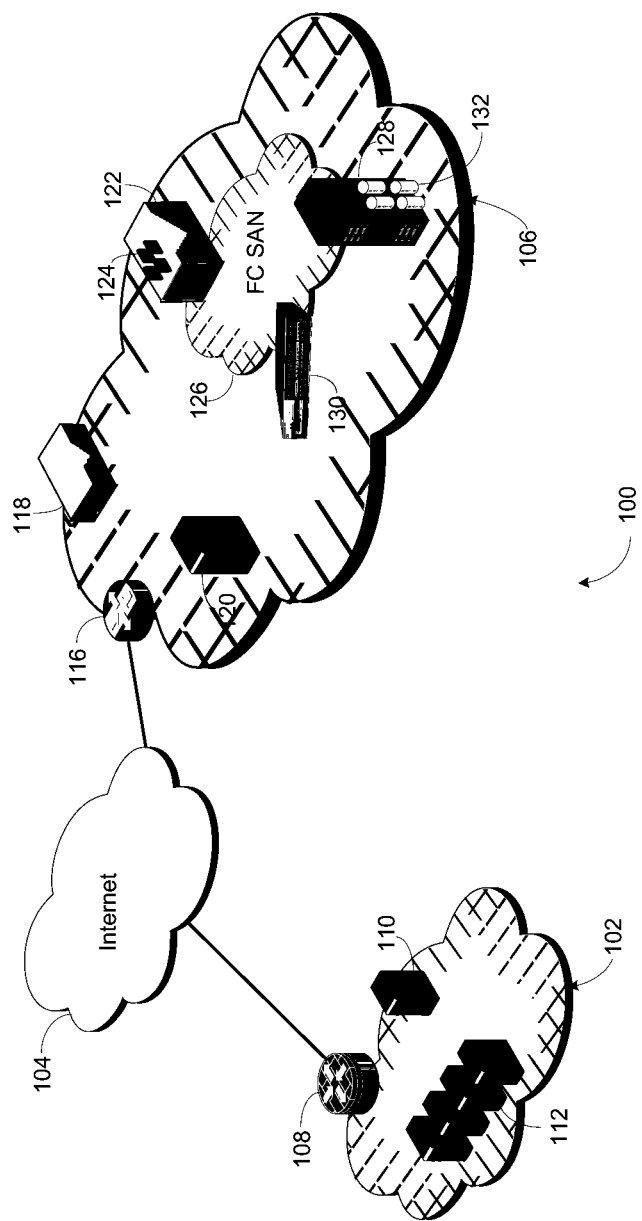
FIG. 1 is a block diagram of an environment according to the present invention.

The preferred embodiment which gives the client control over how the client provisions and secures encrypted LUNs. In particular, it gives the client a more secure mechanism for controlling the configuration of encryption of their data at rest in the public cloud infrastructure. The embodiment involves a mechanism called "Cloud Crypto Domain" or CCD. The embodiment includes adding a service to an encryption at rest switch, such as the Brocade Encryption Switch from Brocade Communications Systems, Inc., see also U.S. Patent Appln. Pub. No. 2011/0038479, published Feb. 17, 2011, which is incorporated by reference. A CCD is a software context, maintained on the encryption switch in the cloud provider's infrastructure that consolidates the data at rest security configuration for an individual customer. The elements in Cloud Crypto Domain are the definition of the storage devices, LUNs on those storage devices, the hosts that are allowed to access each LUN, the data encryption key (DEK) for that LUN, and a root key (KEK) that is specific to a particular client. Note that the root key is particularly important because it is used to encrypt the customer's DEKs. In the encryption switch, the DEKs are never exposed outside of the encryption switch FIPS 140-2 level 3 security boundary, unless they have been already encrypted by the KEK, and this encryption step is only performed within the encryption switch security boundary. If the customer controls the KEK, their DEKs can never be discovered by either the cloud provider or the other clients sharing the service provider infrastructure, the customer's data (encrypted by the DEK) is secure.

The Cloud Crypto Domain provides a discrete unit of configuration that can be removed from the shared the encryption switch, when a client wishes to decommission his LUNs. For example, if a client decides to stop using a particular Cloud Provider Services, the client can have the CCD removed from the provider's the encryption switch. This will remove the client's secure storage configuration and the client's KEK. Since the client's KEK is removed from the shared infrastructure, any data left by the client on storage in the cloud infrastructure is rendered unreadable. Additional security is provided by the fact that the client's DEKs are left only in the client's key vault after such a de-provisioning operation.

The ability to carve up the fabric security device into multiple crypto domains is an aspect of this solution. It provides a unique mechanism for a customer to keep control of their data at rest encryption when they have moved their data and compute resources into a cloud provider's infrastructure. The solution combines the efficiency and scalability of fabric-based data at rest encryption, while removing the exposure of the customer's security configuration (most importantly their root key) to the cloud service provider.

FIG. 14 describes the process for configuring the secure cloud environment and then obtaining data in the secure cloud environment.

In step 1400 the physical infrastructure, including the encryption switch 130, is installed at the cloud provider. The preferred embodiment of the infrastructure is illustrated in FIG. 1. The environment 100 includes three basic network areas, the client network 102, a WAN network 104 such as the Internet and a cloud provider network 106. A firewall and router 108 connect the client network 102 to the WAN 104. A client server no and individual clients 112 are provided in the client network 102.

The cloud provider network 106 is connected to the WAN 104 using a router 116. Present inside the cloud provider network 106 are a web portal 118, which is the web interface for the cloud services; a provider provisioning service 120, which handles the management of the cloud infrastructure; a server 122 which includes a plurality of client VMs 124, storage 128 which contains the LUNs and the encryption switch 130. The use of an encryption switch 130 is preferred because it saves several hops between a normal switch and an encryption appliance and simplifies routing, but a regular switch and an encryption appliance can be used if desired as long as the encryption appliance is in the path from the client VM to the LUN and the added hops are acceptable. The server 122, the storage 128 and the encryption switch 130 are preferably connected using a Fibre Channel storage area network (SAN) 126. The remainder of the communications inside the cloud provider network 106 are generally handled using Ethernet-based local area networks (LANs).

Figure 15:
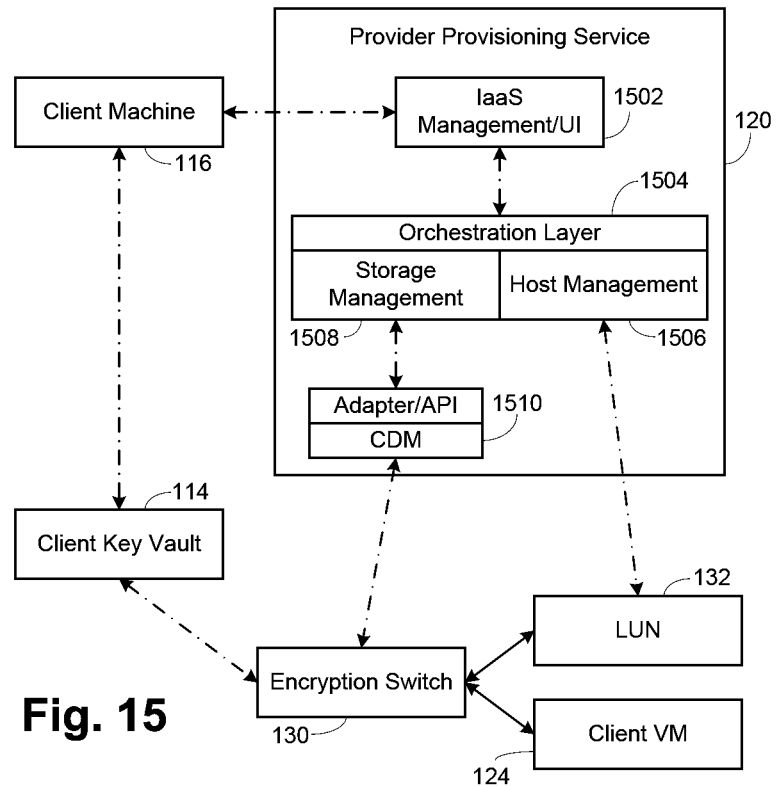
FIG. 15 is a block diagram providing details of the provider provisioning service of FIG. 1.

FIG. 15 provides additional details on the PPS 120. An IaaS (Infrastructure as a Service) management module and user interface 1502 is present to interface with the client machine 116. The IaaS Management module interfaces with an orchestration layer 1504 which includes storage management 1508 and host management 1506 modules. OpenStack from OpenStack.org and Amazon EC2 (Elastic Compute Cloud) from Amazon Web Services LLC are exemplary IaaS providers or systems, with reference to documentation from those entities requested to provide additional background. The host management module 1506 is responsible for configuring and managing the VMs that are used by the clients. The storage management module 1508 is responsible for configuring and managing the storage provided in the environment. In the preferred embodiment a crypto domain manager (CDM) module 1510 is utilized to interface the storage module 1508 to the encryption switch 130 and provide portions of the functionality described herein. The PPS 120, using the CDM module 1510, is mainly used to configure CCDs 500 on the encryption switch 130, pass the public certificate 200 used for KEK encryption from the web portal 118 to the encryption switch 130, configure each CCD 500 with host/storage/LUN configuration and instantiate client VMs 124 for the client 116 that is part of the CCD 500.

Figure 16:
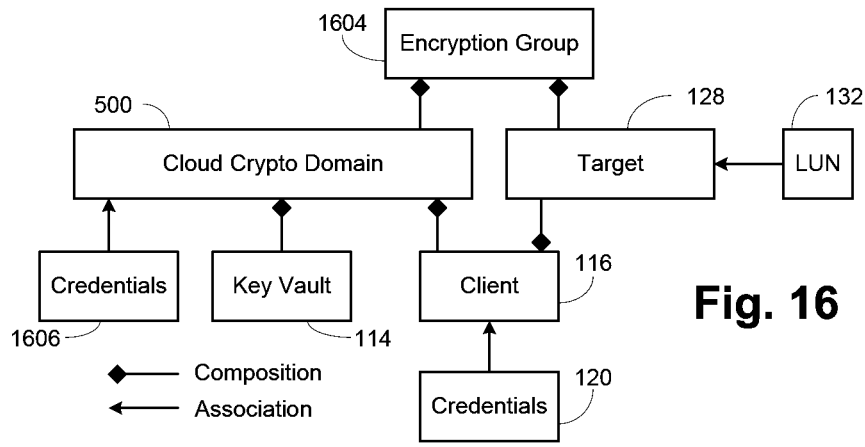
FIG. 16 is an object relation diagram of various portions of an embodiment according to the present invention.

FIG. 16 illustrates the relationships between various items in an embodiment according to the present invention. An encryption group 1604 is the top entity. Each encryption group is composed of cloud crypto domains 500 and targets 128. Each target 128 has associated LUNs 132. A client 116 is a portion of a CCD 500 and includes targets 128. Each CCD 500 includes a client key vault 114 and credentials 1606. The CCD 500 is located in the encryption switch 130 and contains information on the client 116, the client VMs 124, the LUNs 132 and their targets 128, the client key vault 114, the data encryption keys (DEKs) for each LUN 132, the key encryption key (KEK) for the client 116 that owns the CCD 500 and the certificate 200 of the client 116, the certificate 200 including the public key of the client 116. The client key vault 114 maintains all the data encryption keys (DEKs) that are used by the security devices in the cloud infrastructure site to secure clients data.

The encryption switch 130 includes a cloud crypto domain service which controls the creation and configuration of CCDs 500. The PPS 120 interacts with the cloud crypto domain service to make configuration requests for each client. The encryption switch 130 securely stores the client data to the backend storage configured for the client, that is, the encryption switch 130 handles the encryption and decryption for the data at rest in the LUNs 132 and handles enforcement of the CCD 500.

IaaS providers, like Amazon EC2, typically provide a Web-based "Portal" through which an authenticated client can make a request to have resources provisioned for that client's used, referred to here as the web portal 118. For example, a client of Amazon EC2 accesses the Amazon Web-based portal to request the creation of a virtual machine instance. The client will specify parameters like processing power, memory size, and storage capacity. The web portal 118 will then request that the PPS 120 provision the resources requested for the client 116. Configuration of the CCD 500 is initiated in the same fashion through the web portal 118.

Figure 2:
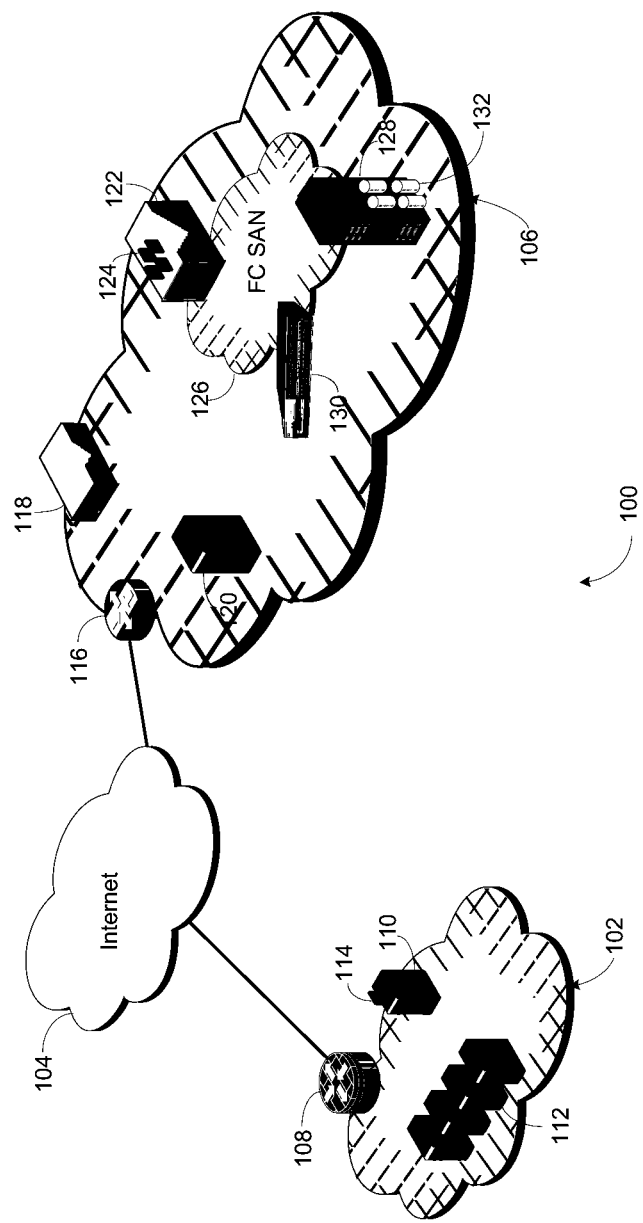
FIGS. 2-13 are illustrations of various operations according to the present invention in the environment of FIG. 1.

Returning to FIG. 14, in step 1402 the client 116 creates a key vault 114 in his environment, either on the client 116 or in most cases in a central server present in the client environment. This is illustrated in FIG. 2.

Figure 3:
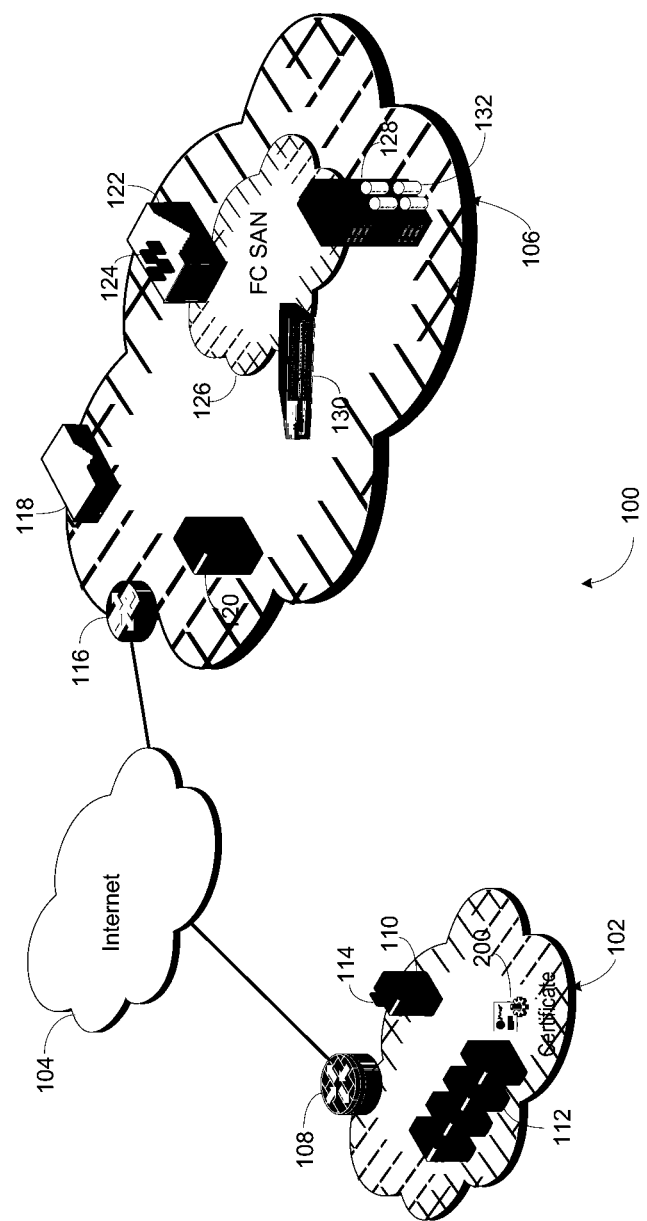

In step 1404 the client 112 creates an X.509 security certificate 200, which creates an RSA key pair. This is illustrated in FIG. 3. The customer retains the private key from the key pair.

Figure 4:
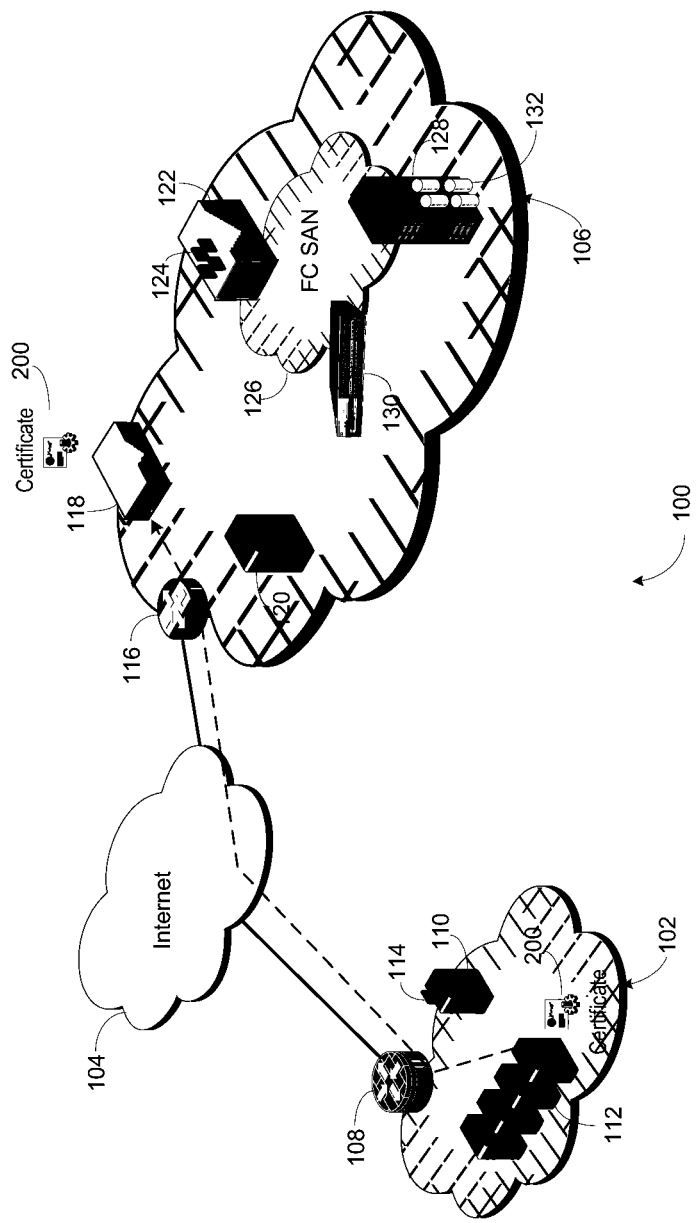

In step 1406, the client 112 logs into the cloud provider web portal 118 and selects the needed service, such as processor speed, memory and storage needed. Additionally, the customer also requests the data at rest encryption service and passes the X.509 security certificate 200. This is illustrated in FIG. 4.

Figure 5:
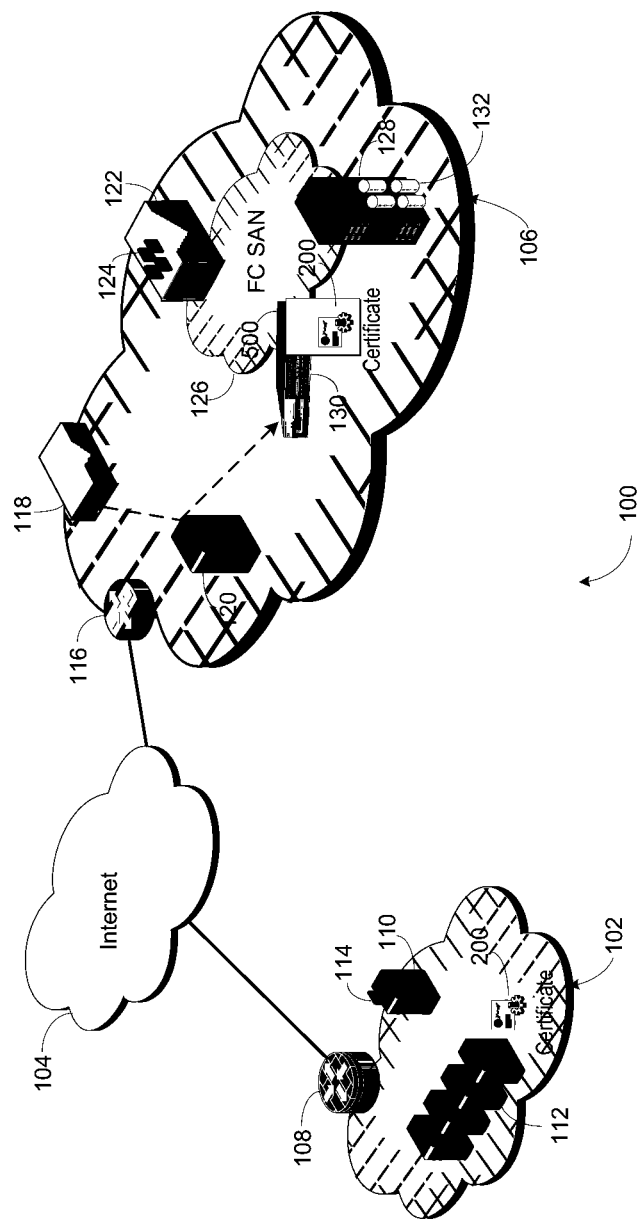

In step 1408 the PPS 120 interfaces to the encryption switch 130 to create a CCD 500 for the client 116. The certificate 200, containing the public key, is passed through the PPS 120 into the encryption switch 130 security boundary. This certificate 200 is bound to the client 116 and kept in the CCD 500 for that client 116. This is illustrated in FIG. 5.

Figure 6:
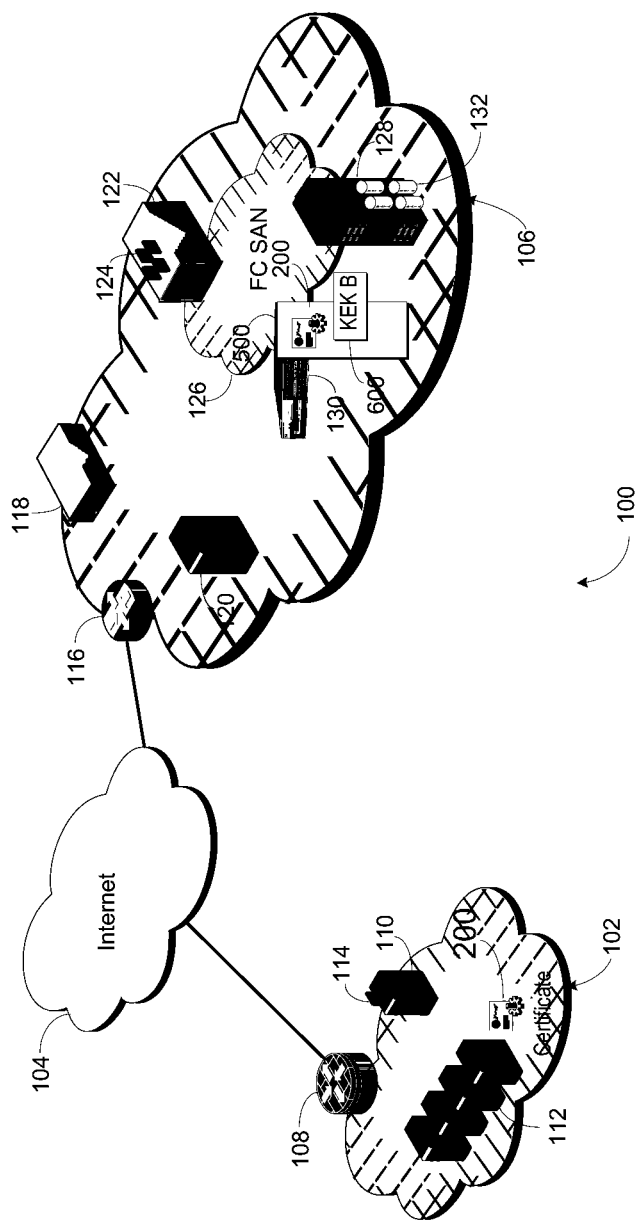

In step 1410 the encryption switch 130, within the security boundary, creates the master key or key encryption key 600 for the client 116. This is illustrated in FIG. 6.

Figure 7:
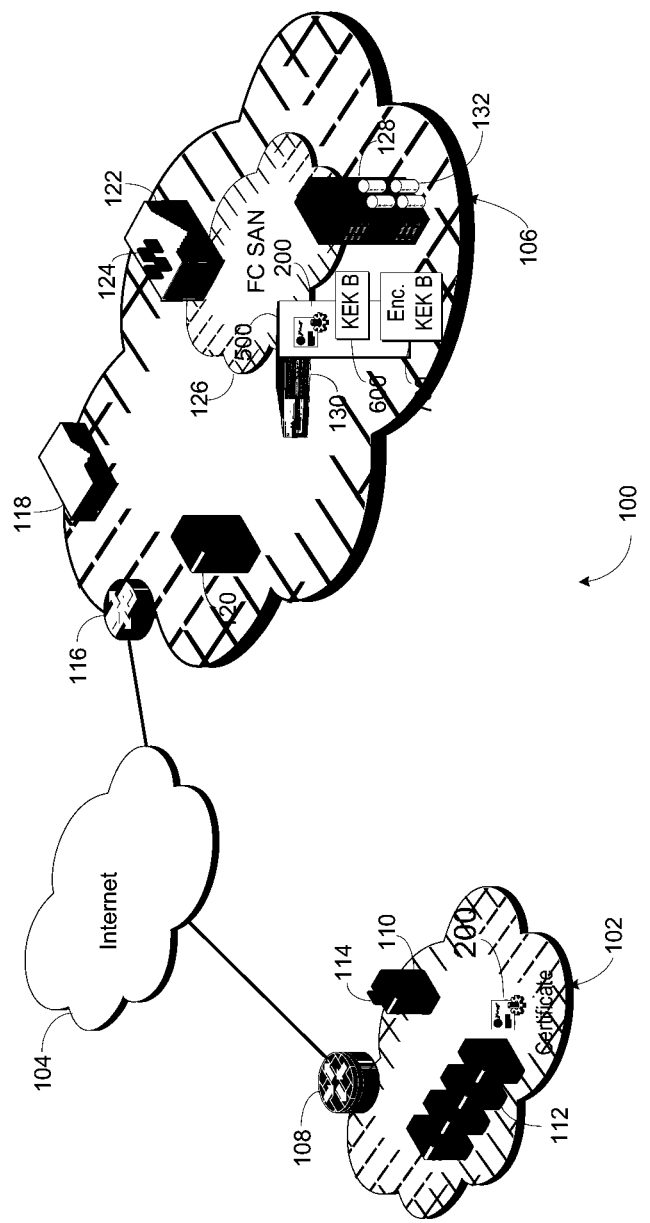

In step 1412 the encryption switch 130, within the security boundary, encrypts the KEK 600 with the client's public key to provide the encrypted KEK 700. This is illustrated in FIG. 7.

Figure 8:
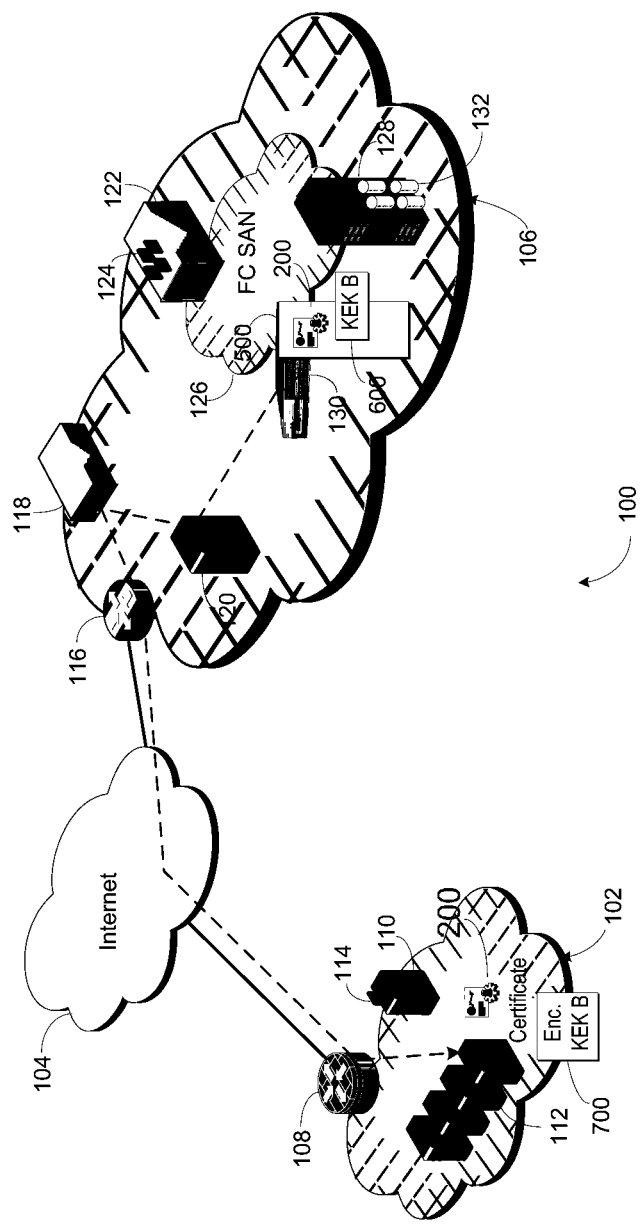

In step 1414 the encryption switch 130 returns the encrypted KEK 700 to the client 116. The client 116 then has the only copy of the KEK 600 that exists outside of the crypto boundary. This KEK 600 is never exposed outside of the security boundary unless it has been encrypted by the client's public key in the encrypted KEK 700. Because of asymmetric encryption (e.g. using RSA key pairs) only the client 116 can decrypt the KEK 600. This provides a firewall between the client's DEKs and the cloud provider. Note that any DEKs created by the encryption switch 130 are maintained within the encryption switch 130 security boundary, except for export to the client 116 or the key vault 114. This is illustrated in FIG. 8.

Figure 9:
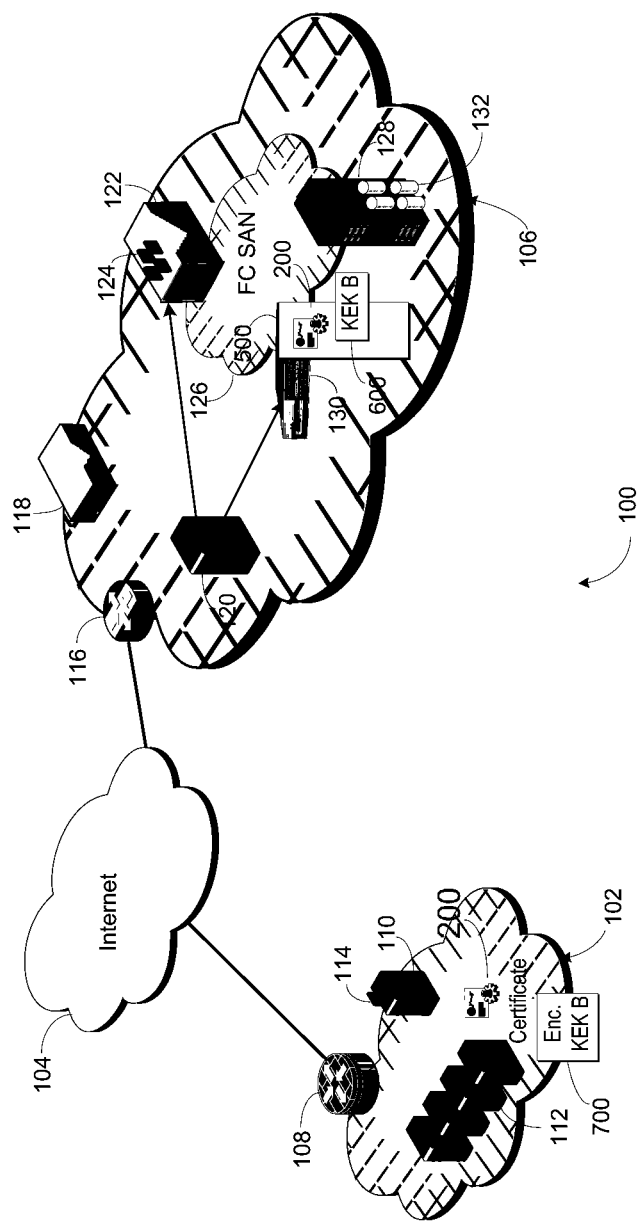

In step 1416 the PPS 120 then instantiates the client VM 124 based on the client's requirements. This step also includes provisioning the customer's LUN 132 for encryption within the client's CCD 500 and creating a nexus between the client VM 124 and the LUN 132, the nexus being stored in the encryption switch 130. This is illustrated in FIG. 9.

Figure 10:
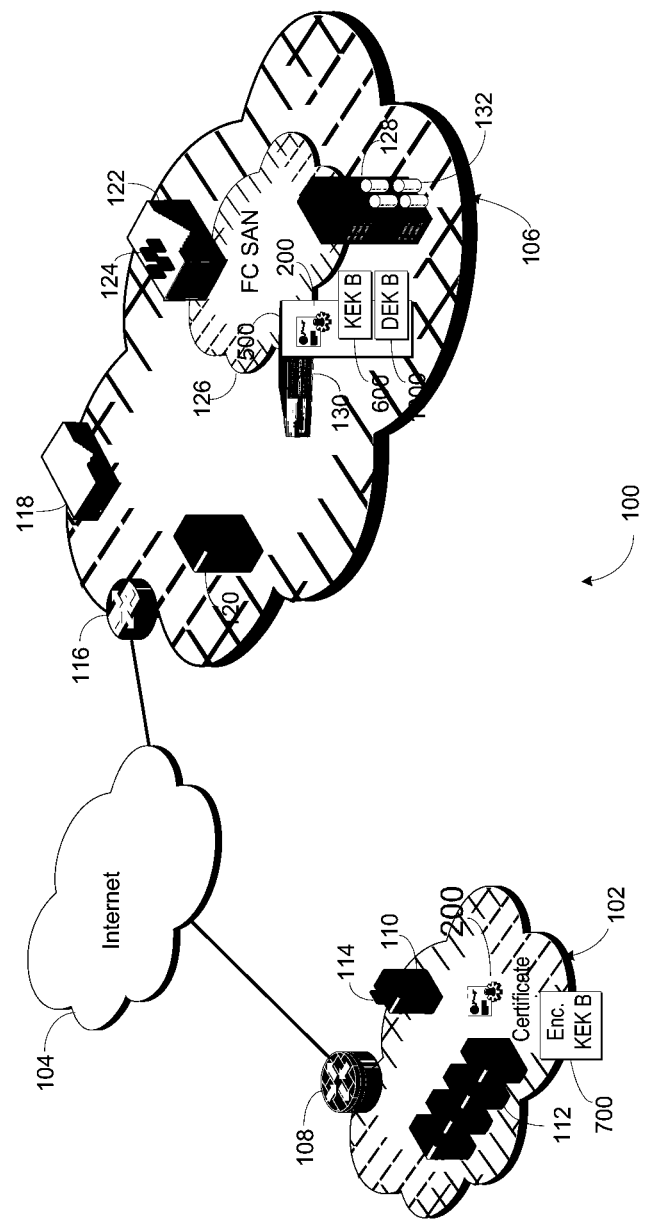
Figure 11:
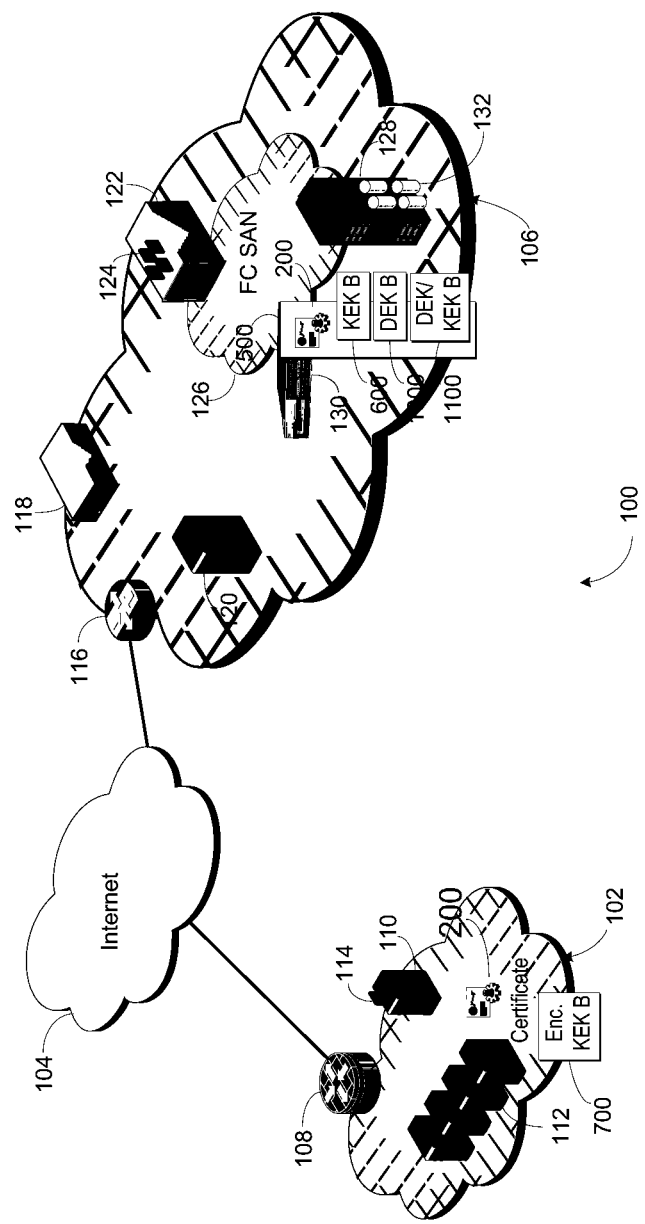
Figure 12:
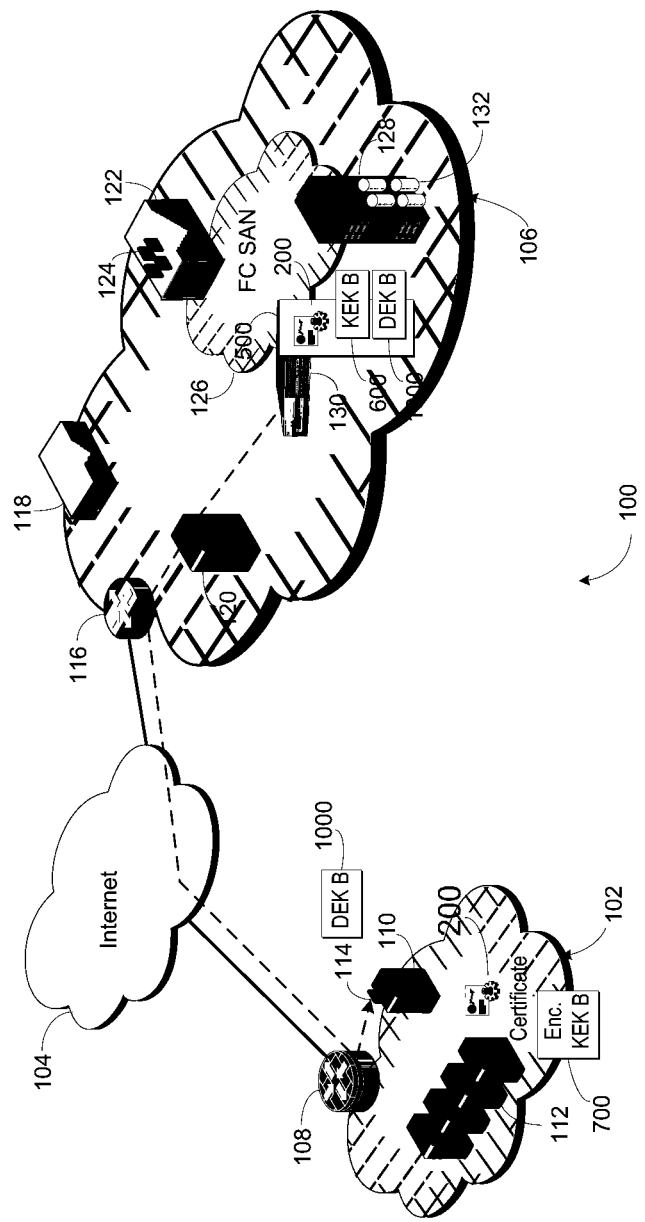

In step 1418 the encryption switch 130 creates the DEK woo for the encrypted LUN 132. This is illustrated in FIG. 10. In step 1420 the encryption switch 130 wraps the DEK woo for the encrypted LUN 132 with client's KEK 600 to from the encrypted DEK 1100. This is illustrated in FIG. 11. In step 1422 the DEK woo is then archived to the client's key vault 114. This is illustrated in FIG. 12. This completes the provisioning the LUN 132 inside the CCD 500.

Figure 13:
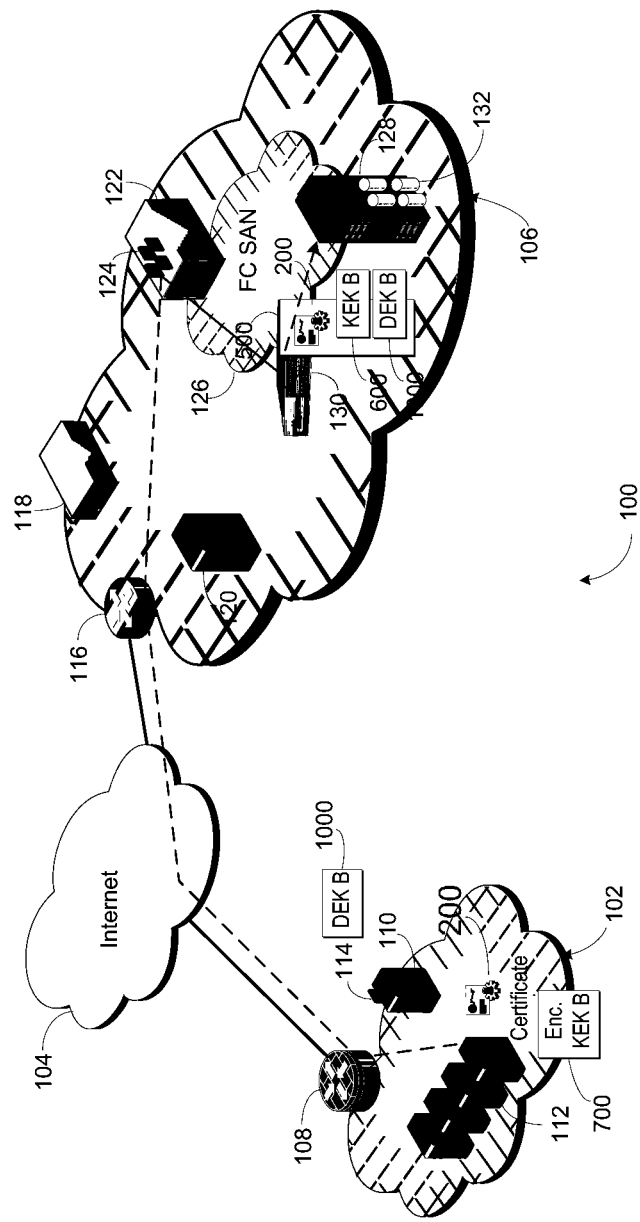

In step 1424 the client 116 uses the instantiated client VM 124 to retrieve and store client data from and to the LUN 132 in the backend storage 128. The encryption switch 130 uses the nexus between the LUN 132 and the client VM 124 to authorize the release of the data to or acceptance of data from the client VM 124. The data that gets stored on the backend target 128 passes through the encryption device 130 and thus get encrypted. The key woo that gets created for each session is securely archived at the client key vault 114. This is illustrated in FIG. 13. As shown by the dashed line, communications from the client 116 to the client VM 124 are encrypted. The solid line indicates that the communication between the client VM 124 and the encryption switch 130 is unencrypted. The data is encrypted from the encryption switch 130 to the LUN 132.

As an overview of the more complete environment at the IaaS provider, which is providing the services for multiple clients the following are generally true. The IaaS provider creates multiple encryption groups 1604 in the cloud environment and maps a set of targets 128 for use by each encryption group 1604. For each cloud client 116 using encryption, there will be a corresponding CCD 500 on the encryption switch 130. The PPS 120 provisions storage for multiple clients, and associates the provisioned LUNs 132 to proper CCDs 500. The LUNs 132 associated to each CCD 500 are encrypted by the encryption switch 130. All the DEKs 1000 used for encrypting the storage of each client 116 are wrapped with a KEK 600 assigned to the client 116 and archived to the key vault 114 configured for the specific client 116/CCD 500 over a TLS interface. Each client 116 manages the KEK 600 for his storage, and the KEK 600 is inaccessible in clear text to anyone, including the IaaS provider, except the crypto module of the encryption switch 130 and the client 116. All the APIs exposed by the encryption switch 130 for CCD use are invoked by the cloud provider, so that there is no interface exposed directly to the client 116. The client 116 can decide to use a common key manager provided by the IaaS provider, and this does not change any security assumptions on the encryption switch 130.

If security is desired between the client VM 124 and the encryption switch 130, the methods discussed in related application entitled "Storage Access Authentication Mechanism" can be utilized in conjunction with the methods, operations and environment discussed herein.

While not described in detail herein, it is understood that various other options and functions can be used in the environment. For example, multiple initiators or client VMs can be used in a CCD; multiple paths to a LUN can be specified; CCDs can be deleted; LUNs can be disassociated, associated or decommissioned; LUNs can be rekeyed, automatically or manually, globally or selectively; key vaults can be changed; or credentials can be changed, any of the certificates, KEKs or DEKs.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A system comprising:
   a storage device including at least one logical unit number (LUN);
   a computer including at least one virtual machine associated with a client; and
   an encryption device interconnecting said storage device and said computer, said encryption device encrypting data provided to and decrypting data from said at least one LUN, said encryption device developing encryption keys for each client and each LUN, at least one LUN associated with each client, and providing client and LUN encryption keys to each client for that client and each LUN associated with that client, said encryption device allowing data transfer between said at least one virtual machine and said at least one LUN based on a nexus between said at least one virtual machine and said at least one LUN.

2. The system of claim 1, further comprising:
   a provisioning service coupled to said computer and said encryption device to create said virtual machine on said computer, configure said at least one LUN for access and develop said nexus between said at least one virtual machine and said at least one LUN.

3. The system of claim 1, wherein said encryption device securely provides client and LUN encryption keys to the client.

4. A method comprising:
   providing a logical unit number (LUN) for data storage;
   providing a virtual machine associated with a client;
   providing an encryption device that encrypts data provided to and decrypts data from said at least one LUN;
   developing encryption keys for each client and each LUN, at least one LUN associated with each client;
   providing client and LUN encryption keys to each client for that client and each LUN associated with that client; and
   using said encryption device to allow data transfer between said virtual machine and said LUN based on a nexus between said at least one virtual machine and said at least one LUN.

5. The method of claim 4, further comprising:
   developing said nexus between said at least one virtual machine and said at least one LUN.

6. The method of claim 4, further comprising:
   securely providing said client and LUN encryption keys to the client.

7. A secure access system comprising:
   a computer readable storage medium containing computer instructions causing a computer to develop a nexus between a virtual machine associated with a client and at least one logical unit number (LUN); and an encryption device for interconnecting a storage device including at least one LUN and a computer executing a virtual machine associated with a client, said encryption device encrypting data provided to and decrypting data from said at least one LUN, said encryption device developing encryption keys for each client and each LUN, at least one LUN associated with each client, and providing client and LUN encryption keys to each client for that client and each LUN associated with that client, said encryption device allowing data transfer between said virtual machine and said at least one LUN based on said nexus between said virtual machine and said at least one LUN.

8. The secure access system of claim 7, wherein said encryption device securely provides client and LUN encryption keys to the client.

* * * * *